United States Patent
Iwasaki et al.

[19]

[11] Patent Number: 5,995,516
[45] Date of Patent: Nov. 30, 1999

[54] DATA TRANSMITTING SYSTEM

[75] Inventors: Atsushi Iwasaki; Tatsuya Kubota; Takayuki Takeda; Youichi Matsumura, all of Kanagawa, Japan

[73] Assignee: Sony Corporation, Tokyo, Japan

[21] Appl. No.: 08/793,614

[22] PCT Filed: Jul. 17, 1996

[86] PCT No.: PCT/JP96/01991

§ 371 Date: Jul. 22, 1997

§ 102(e) Date: Jul. 22, 1997

[87] PCT Pub. No.: WO97/04594

PCT Pub. Date: Feb. 6, 1997

[30]   Foreign Application Priority Data

Jul. 17, 1995  [JP]  Japan ................................. 7-180464

[51] Int. Cl.⁶ .......................................................... H04J 3/22
[52] U.S. Cl. ........................................... 370/466; 348/474
[58] Field of Search ................................. 370/493, 507, 370/508, 395, 474, 535, 536, 537, 12, 494, 495, 466, 465, 522, 473; 348/13, 423, 473, 474

[56]                 References Cited

U.S. PATENT DOCUMENTS

| 5,140,417 | 8/1992  | Tanaka et al. .......................... 348/384 |
| 5,289,277 | 2/1994  | Blanchard et al. ..................... 348/441 |
| 5,426,527 | 6/1995  | Steen et al. ............................. 359/123 |
| 5,502,497 | 3/1996  | Yamaashi et al. ..................... 348/473 |
| 5,544,161 | 8/1996  | Bigham et al. ......................... 370/397 |
| 5,563,884 | 10/1996 | Fimoff et al. .......................... 370/391 |
| 5,583,574 | 12/1996 | Tanaka et al. .......................... 348/479 |
| 5,696,557 | 12/1997 | Yamashita ............................... 348/390 |
| 5,721,738 | 2/1998  | Kubota et al. .......................... 370/508 |
| 5,805,762 | 7/1998  | Boyce et al. ............................ 386/68 |
| 5,903,569 | 4/1999  | Fujisaki .................................. 370/472 |

FOREIGN PATENT DOCUMENTS

| 5145925 | 6/1993 | Japan ............................. H04N 7/173 |
| 0686244 | 3/1994 | Japan ............................. H04N 7/08 |
| 6261300 | 9/1994 | Japan ............................. H04N 7/08 |

*Primary Examiner*—Douglas W. Olms
*Assistant Examiner*—Kenneth Vanderpuye
*Attorney, Agent, or Firm*—Jay H. Maioli

[57]                 ABSTRACT

A digital video signal is transmitted via a communication system which can transmit digital data through an asynchronous communication line (ATM communication line) or the like and, at the same time, voice information for the working communication and information such as computer information are transmitted by using the communication system. The user of a first data transmitting apparatus sets up the character data etc. for communication on the terminal. The set character data is multiplexed in the predetermined transmission packet together with the audio and video data output from the VTR device and transmitted via an ATM communication line 2 to a second data transmitting apparatus. In the second data transmitting apparatus, the character data is demultiplexed from the transmission packet and displayed on for example the display device of the personal computer. In place of the character information, also voice information can be transmitted by a telephone set. In this way, the users of both data transmitting apparatuses transmit and receive the working communication information by using the communication line for transmitting the digital video signal.

5 Claims, 12 Drawing Sheets

(A) HEADER DATA  (B) ▨ : ANCILLARY DATA

▨ : VIDEO DATA

BLANK : UNNECESSARY DATA (VOICE, 4fsc, NCLK AND SYNC ARE OMITTED)

3b 5,995,516

DATA TRANSMITTING SYSTEM

TECHNICAL FIELD

The present invention relates to a data transmitting system for transmitting a digital video signal and working data related to the processing thereof by using the same communication system. Particularly, the present invention relates to a data transmitting system for transmitting a digital video signal by a predetermined format via an ATM communication line or the like and, at the same time, providing a voice call function and a data communication function to a user.

BACKGROUND ART

Recently, the asynchronous transmission mode (ATM) system has been put into practical use as a high speed digital data transmitting system. Experiments have been made on transmitting a large amount of digital video signals by the ATM system with a good efficiency.

Note that, in the present description, a "video signal" means both of a video signal and a voice (or audio) signal in relation to this.

For example, when an ATM communication line is used to transmit a video signal reproduced from a VTR device (first VTR device) to another party using a transmitting apparatus (first transmitting apparatus) and to receive the transmitted video signal at an opposite (second) transmitting apparatus where editing work is carried out by using a VTR device (second VTR device) and an editing device, the communication for this is carried out by using a telephone in many cases. It can also be considered to perform the data communication by computers etc. in place of a telephone or in addition to a telephone.

In such a case, for the transmission of the video signal, the transmission is carried out by using the ATM communication line or the like and a telephone line is used for the call for the communication. Also in data communication by computers etc., the data communication is carried out by using the telephone line. Namely, different communication systems are necessary such as both of a communication system for transmitting a large amount of video signals and a telephone line for communication small in amount but taking a long time such as a voice call and data communication. In general, the editing work takes a long time in many cases. In addition, where the transmission of the video signal or telephone communication between distant places is carried out, the communication costs become high.

Not limited to the ATM system, in other cases as well where a digital video signal is transmitted by using another communication system, the data is reproduced on the reception side, telephone communication is performed while viewing that video, and transmission and reception of a new digital video signal is carried out, the same problem as above is encountered.

DISCLOSURE OF THE INVENTION

An object of the present invention is to provide a data transmitting system which enables transmission of a digital video signal and working information by using the same communication system.

Another object of the present invention is to provide a data transmitting system which transmits the digital video signal with a good efficiency by using a communication system which can efficiently transmit the digital video signal and can transmit the working information with a good efficiency by using that communication system.

Still another object of the present invention is to provide a data transmitting system which is low in price and can transmit the digital video signal and the working information by using the same communication system.

According to a first aspect of the present invention, there is provided a data transmitting system provided with a communication system which can communicate a digital signal; a first transmitting apparatus having a transmitting means connected to the communication system; and a second transmitting apparatus having a receiving means connected to the communication system and performing the digital data transmission with the first transmitting apparatus in cooperation with the first transmitting apparatus, the transmitting means for the first transmitting apparatus transmitting a digital video signal and first working information concerning the processing of the digital video signal as digital information to the communication system, and the receiving means for the second transmitting apparatus receiving the digital video signal and the first digital working information transmitted by the transmitting means for the first transmitting apparatus from the communication system.

According to a second aspect of the present invention, there is provided a data transmitting system provided with a communication system which can communicate a digital signal; a first transmitting apparatus having a first transmitting means and a first receiving means connected to the communication system; and a second transmitting apparatus having a second transmitting means and a second receiving means connected to the communication system and performing digital data transmission with the first transmitting apparatus in cooperation with the first transmitting apparatus, the second transmitting means for the second transmitting apparatus transmitting second digital working information indicating the digital video signal which should be received from the second transmitting apparatus by the communication system, the first receiving means for the first transmitting apparatus receiving the second digital working information via the communication system, the first transmitting means for the first transmitting apparatus transmitting the digital video signal in accordance with the second digital working information received by the second receiving means to the communication system, and the second receiving means for the second transmitting apparatus receiving the digital video signal transmitted by the transmitting means for the first transmitting apparatus from the communication system.

According to a third viewpoint of the present invention, there is provided a data transmitting system provided with a communication system which can communicate a digital signal; a first transmitting apparatus having a first transmitting means and a first receiving means connected to the communication system; and a second transmitting apparatus having a second transmitting means and a second receiving means connected to the communication system and performing digital data transmission with the first transmitting apparatus in cooperation with the first transmitting apparatus, the first transmitting means for the first transmitting apparatus transmitting a digital video signal and first working information concerning the processing of the digital video signal as first digital working information to the communication system, the receiving means for the second transmitting apparatus receiving the digital video signal and the first digital working information transmitted by the first transmitting means for the first transmitting apparatus from the communication system, the second transmitting means for the second transmitting apparatus transmitting the first working information concerning the processing of the digital video signal as the first digital working information to the communication system, and the first receiving means for the first transmitting apparatus receiving the second digital working information via the communication system.

Preferably, the communication system transmits a signal of an SDI (Serial Data Interface) format and the digital video signal and the working contact information are transmitted by the SDI format.

Also, preferably, the communication system includes a communication line of an asynchronous transmission mode (ATM) system.

Further preferably, an adapter for performing signal adjustment between the SDI format or the SDDI format and the format of the communication line is provided between the data transmitting apparatus and the communication system.

Preferably, the first transmitting means includes a multiplexing means; and the first digital working information is transmitted while being multiplexed on one part of the transmission format of the digital video signal at the transmission of the digital video signal. The second receiving means has a demultiplexing means for demultiplexing the multiplexed and transmitted signal.

Alternatively, the first digital working information is transmitted at a timing different from that at the transmission of the digital video signal.

Specifically, the first digital working information and/or the second digital working information is telephone information. Alternatively, the first digital working information and/or the second digital working information is computer information.

According to a fourth aspect of the present invention, there is provided a data transmitting system wherein a first transmitting apparatus and a second transmitting apparatus are connected via a communication system of an asynchronous transmission mode (ATM) system, and the digital video signal is transmitted between these first and second transmitting apparatuses via the communication system, wherein each of the first and second data transmitting apparatuses has a data terminal for communicating the working digital data concerning the processing of the digital video signal; a multiplexing means for multiplexing the working data and the digital video signal transmitted by the data terminal in a predetermined transmission packet; a transmitting means for transmitting the working data and the digital video signal multiplexed in the transmission packet to the data transmitting apparatus of other party via the communication system; and a demultiplexing means for demultiplexing the digital video signal and the working data from the transmission packet transmitted from the data transmitting means for the other party of communication via the communication system and making the data terminal accept this.

BEST MODE FOR CARRYING OUT OF THE INVENTION

First Embodiment

Below, a first embodiment of the present invention will be explained.

Figure 1:
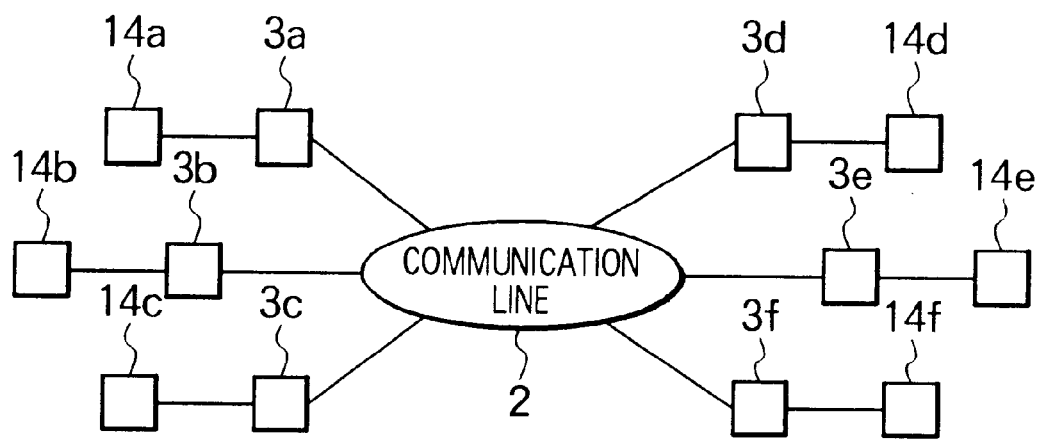
FIG. 1 is a view of the overall configuration of a data transmitting system of the present invention.

FIG. 1 is a view of the configuration of a data transmitting system 1 according to the present invention.

The data transmitting system 1 transmits video signals reproduced in a plurality of audio and video processing apparatuses 14a to 14c, for example, VTRs, from a plurality of data transmitting apparatuses 3a to 3c to a plurality of data transmitting apparatuses 3d to 3f via a communication system 2, reproduces the same at a plurality of audio and video processing apparatuses 14d to 14f, for example VTRs, or performs reverse processing to this. In the present embodiment, it is constituted by the data transmitting apparatuses 3a to 3f which are mutually connected via an ATM communication line 2 which provides a transmission line of the AAL1 protocol to the same. Note that, as the protocol of the ATM communication line 2, in addition to the AAL1 protocol, the use of an AAL5 protocol having synchronization data and other protocols can be considered too.

In the present embodiment, as a preferred example, the case where an ATM communication line 2 is used for the communication system is shown, but in the working of the present invention, it is not limited to an ATM communication line. Other digital data communication systems can be used as well.

The data transmitting apparatuses 3a to 3f transmit the predetermined transmission data, for example, the audio and video data for program or relay use, via the ATM communication line 2 to each other.

In the present description, "video signal" is used as a term referring to audio and video data as a whole.

Figure 2:
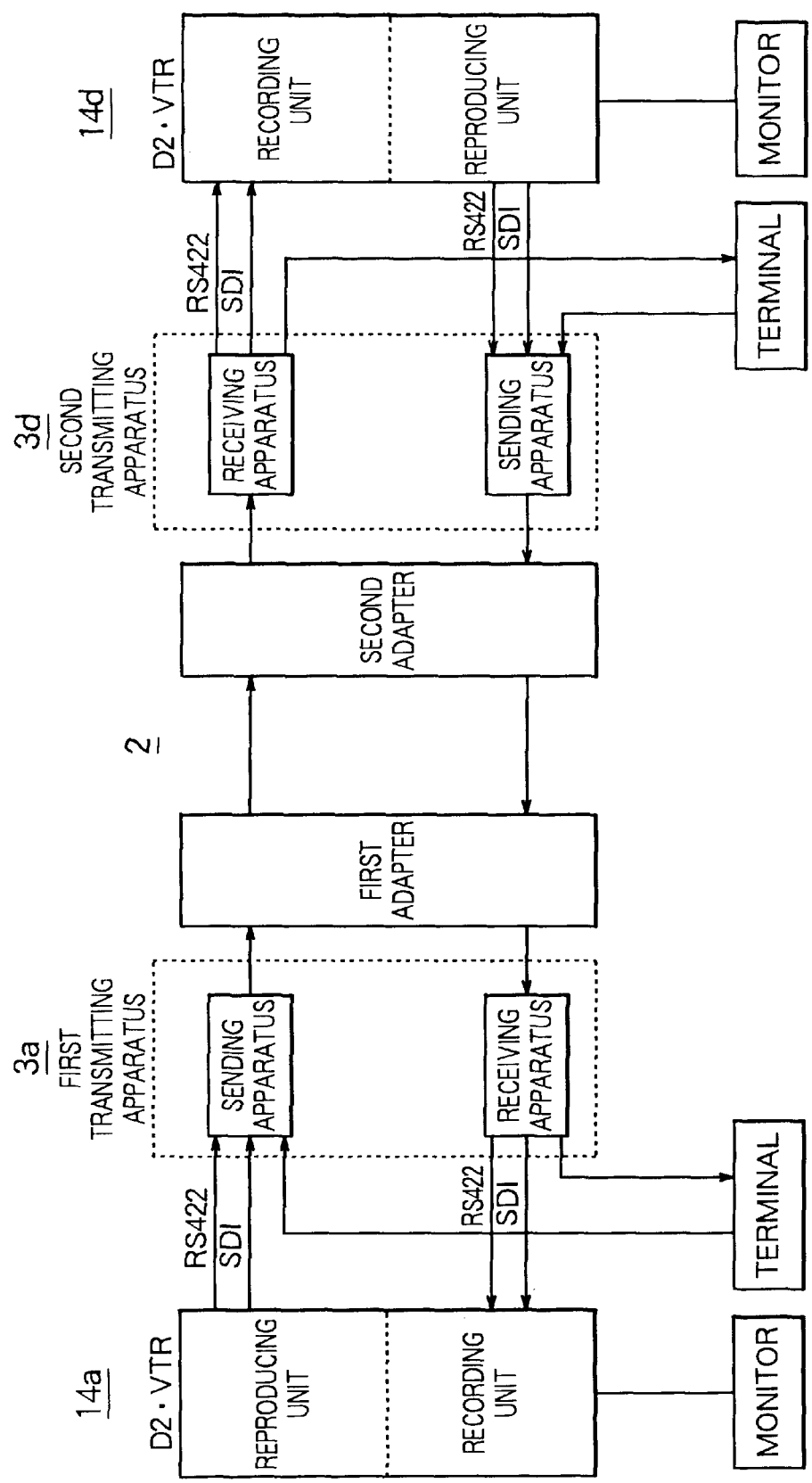
FIG. 2 is a view of the configuration of one part shown in FIG. 1.

FIG. 2 is a view of the general configuration of one system of the data transmitting system shown in FIG. 1.

The audio and video processing device 14a is a VTR of the D2 system having a reproducing unit and a recording unit and to which a TV monitor which can display the reproduced image is connected. Of course, also the sound is reproduced. Also, the audio and video processing device 14d is a VTR of the D2 system having a reproducing unit and a recording unit and to which a TV monitor which can display the reproduced image is connected. Of course, also the sound is reproduced.

The data transmitting apparatus (first data transmitting apparatus) 3a has a sending apparatus (first sending apparatus) and a receiving apparatus (first receiving apparatus). Also the data transmitting apparatus (second data transmitting apparatus) 3d has a sending apparatus (second sending apparatus) and a receiving apparatus (second receiving apparatus).

The sending apparatus (first sending apparatus) of the data transmitting apparatus 3a receives the video signal of the SDI format reproduced at the reproducing unit of the VTR 14a and sends the same to the receiving apparatus (second receiving apparatus) of the second data transmitting apparatus 3d. The receiving apparatus (second receiving apparatus) of the data transmitting apparatus 3d receives the video signal sent from the first sending apparatus and sends this to the recording unit of the VTR 14d, at which reproducing unit of the VTR 14d the once recorded video signal is reproduced. This reproduced video signal is displayed on the second TV monitor.

The sending apparatus (second sending apparatus) of the data transmitting apparatus 3d receives the video signal of the SDI format reproduced at the reproducing unit of the VTR 14a and sends the same to the receiving apparatus (first receiving apparatus) of the first data transmitting apparatus 3a. The receiving apparatus (first receiving apparatus) of the data transmitting apparatus 3a receives the video signal sent from the second sending apparatus and sends this to the recording unit of the VTR 14a, at which reproducing unit of the VTR 14a the once recorded video signal is reproduced. This reproduced video signal is displayed on the first TV monitor.

In the case of editing of the video signal etc., the communication of the video signal is carried out between the VTR 3a and VTR 3d. For confirmation of this, telephone or computer communication etc. is carried out. For this reason, each of the first data transmitting apparatus and second data transmitting apparatus has connected to it a data terminal, for example, a telephone set or computer communication apparatus. The information of the telephone set, computer communication apparatus, etc. is communicated by using the communication system the same as that for the digital video signal by using the sending apparatus of the first data transmitting apparatus and the receiving apparatus of the second data transmitting apparatus or the sending apparatus of the second data transmitting apparatus and the receiving apparatus of the first data transmitting apparatus.

Namely, where a digital video signal is transmitted by using the communication system 2, an idle time appears in the transmission of the digital video signal. Further, there are standby regions in the transmission format of the digital video signal. The working contact information from the telephone set etc. comprises a small amount of data when compared with the digital video signal. Accordingly, in the present invention, the working contact information can be sent by introducing the same into the idle time or standby regions. As a result, it becomes possible to transmit the digital video signal and the information for the working communication by using the same communication system. The communication system 2 is secured for the communication of the digital video signal during the editing work. For example, when the telephone information is communicated multiplexed at the transmission of the digital video signal, it becomes possible to eliminate the necessity of a telephone call to almost zero.

Note that, in order to adjust the signal format in the communication system 2, the first data transmitting apparatus 3a, or the second data transmitting apparatus 3d, an adapter is provided according to need.

Between the first data transmitting apparatus 3a and the VTR 14a of the D2 form, in the present embodiment, the digital video signal is communicated by the format of the SDI system and the control information thereof is transmitted by the RS422 system.

Below, the embodiment of the present invention will be mentioned in more detail.

Note that, the frequency of a line clock NCLK used when dividing the frequency of a clock of 155.52 MHz respectively supplied from the ATM communication line 2 to the data transmitting apparatuses 3a to 3f by eight and processing the ATM cells as 8-bit parallel data is 19.44 MHz (155.52/8). On the other hand, an internal clock $4f_{sc}$ used in the data transmitting apparatuses 3a to 3f when performing the transmission by the SDI system is about 14.3 MHz. Where they are respectively correct, the frequencies of these clocks have a relationship of a whole number ratio (NCLK: $4f_{sc}$=1188:875).

The VTRs 14a to 14f record and reproduce the digital audio and video data of the D2 standard in synchronization with the internal clock $4f_{sc}$ and output the same to each of the data transmitting apparatuses 3a to 3f in the 143 Mbps serial format by the SDI system or the SDDI system obtained by enhancing the SDI system (hereinafter they will be referred to overall simply as the SDI system).

Figure 3:
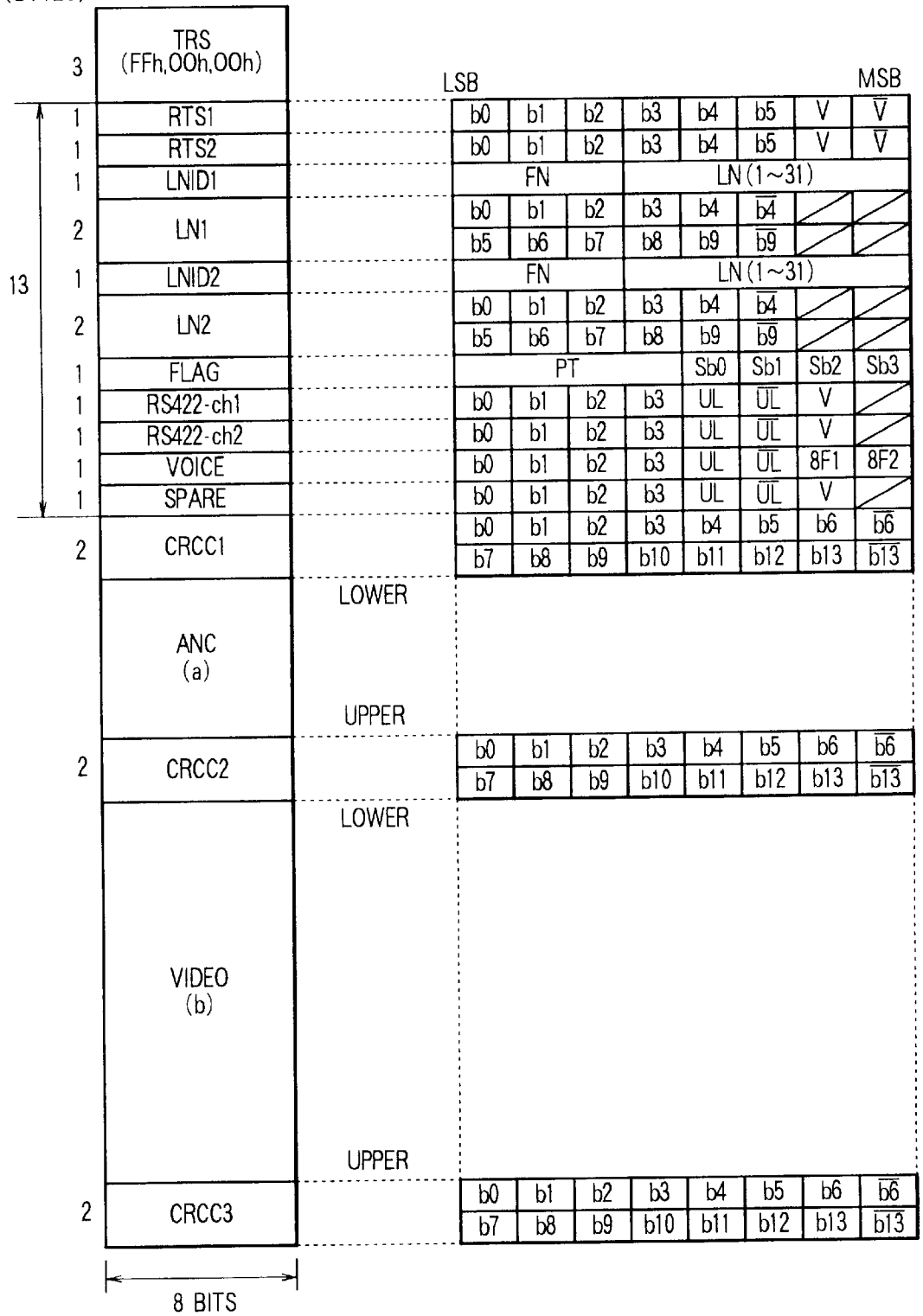
FIG. 3 is a view of the configuration of a transmission packet (PDU packet) based on an SDI format mutually transmitted by the data transmitting apparatuses shown in FIG. 2 via an ATM communication line.

FIG. 3 is a view of the configuration of the transmission packet (SSCU-PDU packet, hereinafter, abbreviated as "PDU packet") using the format of the SDI (Serial Data Interface) system to be transmitted by the data transmitting apparatus 3a and the data transmitting apparatus 3d shown in FIG. 2 to each other via the ATM communication line 2. Note that, the numerals attached to the left of the PDU packet indicate the byte length of each data, and the table attached to the right of the PDU packet indicates the content of corresponding data.

In this example, the conversation information is stored in the part of VOICE, the control code of telephone set, for example, a ringer ringing signal, is stored in the sub-bits sb0 to sb3, the audio signal is stored in the part of ANC, and the video signal is stored in the part of VIDEO. Namely, this example is an example of a case where the video signal, audio signal, telephone set control information, and conversation information are transmitted multiplexed.

The data transmitting system 1 uses a PDU packet shown in FIG. 3 as the transport packet.

In the PDU packet, the data TRS has FFh (h indicates hexadecimal notation), 00h,00h as the content and indicates the leading position of the PDU packet. Note that, except for the data inserted in the data TRS, ancillary data (ANC) region, and video data (VIDEO) region at intervals of 5 bytes, it is prohibited that the data contained in the PDU packet take the value of 00h or FFh.

In the data transmitting apparatus, by detecting this data TRS, it can be identified that the data after this is the data of the PDU packet. Accordingly, the PDU packet having a VOICE region in which the conversation information etc. are stored, an ancillary data region of a variable data length in which the audio signal is stored, and a video data region in which the video signal is stored can be processed not by the units of payload units of the ATM cell.

In the data RTS1 and RTS2, synchronization data RTS taking a value of 6 bits obtained by subtracting 832 from the calculated value of the internal clock $4f_{sc}$ during 1188 cycles of the external clock NCLK is placed. Note, since the transmission packet is transmitted for a time corresponding to 910 cycles of the internal clock $4f_{sc}$, there is a possibility of appearance of two calculated values during a period where one transmission packet is transmitted. The two regions of the data RTS1 and RTS2 are secured so as to cope with such a case. As the method of establishment of synchronization using this synchronization data RTS, the SRTS method etc. have been known.

The data RTS1 and RTS2 are used for establishment of net synchronization in the data transmitting apparatus 3 on the reception side (hereinafter data transmitting apparatus 3 is referred to where the description does not specify either of the data transmitting apparatuses 3a to 3f). Note that, a validity bit V (Valid) is placed in the sixth bit of the data RTS1 and RTS2. The content of the validity bit V becomes the logical value 1 where these data are valid and becomes a logical value 0 where they are not valid. Further, in order to avoid the value of the data becoming 00h or FFh, the logically inverted value of the validity bit V is added as a seventh bit.

The data LNID (Line Number ID) is used for the identification of the audio data and video data of the transmission data respectively contained in the ancillary data region and video data region in the same PDU packet, in which the zero-th to second bits indicate the field number (FN) indicating the field in which the audio and video data is contained, and third to seventh bits taking values of 0 to 31 indicate the line number (LN) indicating the line in which the audio and video data is contained.

The data LN1 takes a value within a range of from 1 to 525 and is used for the identification of the audio and video data within the range of 2 fields together with the data LNID1. In the zero-th to fourth bits of the first byte and second byte of the data LN1, the zero-th to fourth bits and fifth to ninth bits of numerical values are placed. The logically inverted value of the fourth bit is placed in the fifth bit of each for the same reason as that for the validity bit V of the data RTS1 and RTS2.

The data LNID2 and LN2 are used where the data transmitting apparatus 3 on the transmission side performs the compensation for the transmission delay time produced in the transmission data (transmission packet) in the ATM communication line 2 or the like where the time at which the data transmitting apparatus 3 on reception side processes the transmitted transmission data is determined, for example, where the received transmission data is used in a program during telecasting in real time.

That is, the data LNID2 and LN2 indicate by how many lines earlier the audio and video processing apparatus 14 should reproduce the transmission data and the data transmission apparatus 3 should transmit this transmission data so as to compensate for the transmission delay time of the audio and video data contained in the same PDU packet in the television broadcasting station on the transmission side. Note that, the details of the contents of data LNID2 and LN2 are the same as those of the above data LNID1 and LN1.

Note that, by referring to the data LNID2 and LN2, the transmitting apparatus 3 on the reception side can identify the shuffling method of the audio data and video data contained in the ancillary data region and video data region. That is, the transmitting apparatus 3 discriminates the shuffling blocks (at interval of 23 lines or the like) of the part of the data regarding the video among the audio and video data from the data LNID2 and LN2 and performs the deshuffling for every shuffling block.

In the data FLAG, the packet table (PT) data indicating the data amount of the ancillary data portion and video data portion are placed in the zero-th to third bits. In the fourth to seventh bits, bits sb0 to sb3 are placed. These bits sb0 to sb3 are used for transmitting the system of shuffling on the encoder side. Further, as mentioned above, it is used also for the control of the telephone set, computer communication, etc.

As shown in FIG. 2, the data RS422-ch1 and RS422-ch2 are used for the transmission of the data for control using the RS422 between the audio and video processing apparatuses 14 connected to the data transmitting apparatuses 3 on the transmission side and reception side, respectively.

In zero-th to third bits of the data RS422-ch1 and RS422-ch2, either of the higher significant 4 bits or lower significant 4 bits of the data which are respectively transmitted are placed. In the fourth bit is placed a bit UL (Upper/Lower) which becomes 1 when the data placed in the zero-th to third bits is the upper significant 4 bits and becomes 0 where it is the lower significant 4 bits. For the same reason as that for the validity bit V of the data RTS1 and RTS2, a logically inverted value of the fourth bit is placed in the fifth bit.

Further, a validity bit V indicating whether or not the data RS422-ch1 and RS422-ch2 are respectively valid is added to the sixth bit.

In the data VOICE, the voice data used for communication or the like is placed. The voice data is produced at intervals of 8 bits for every 2 cycles of the horizontal synchronization signal (15.75 KHz) of the video signal so that it can be sampled with a sampling frequency almost equal to the sampling frequency of the PCM coding device used in for example a general telephone communication and in addition it can be easily placed into the PDU packet in terms of timing. Accordingly, this means that one series of voice data is transmitted over two PDU packets, each PDU packet being produced for every cycle of the horizontal synchronization signal. Note that, in the case shown in FIG. 3, the upper significant 4 bits or lower significant 4 bits of the voice data are placed in the zero-th to third bits of the data VOICE.

The control signal of this telephone communication is set in the fourth to seventh bits of the data FLAG and sb0 to sb3. As the control of the telephone set, there are for example a ringer ringing command etc.

Further, in the fourth bit, similar to the data RS422-ch1 and RS422-ch2, the bit UL indicating whether the data of zero-th to third bits is the upper significant 4 bits or lower significant 4 bits is placed, and in the fifth bit, for the same reason as that for the validity bit V of the data RTS1 and RTS2, the logically inverted value of the fourth bit is placed. Further the validity bit V indicating whether or not the voice data is valid is added.

Further, in the sixth bit and seventh bit, bits 8F1 and 8F2 (8F is an abbreviation of 8 Frames) used for measuring the delay time to be given to the PDU packet by the internal circuit of the data transmitting apparatus 3 and the ATM communication line 2 are placed. Note that, the data to be placed in the data LNID2 and LN2 are calculated based on the delay time measured by using these bits 8F1 and 8F2.

The stand-by data is a region made empty for stand-by use for a case where another purpose occurs, but similar to the data RTS1 and RTS2, the logically inverted value of the sixth bit is placed in the seventh bit so that the value does not become any of 00h and FFh.

In the data CRCC1, CRCC2, and CRCC3, an error correction code of each preceding data region is placed. Note that, similar to the data RTS1 and RTS2, the logically inverted value of the sixth bit is placed in the seventh bit so that the value does not become any of 00h and FFh.

Note that, the data TRS to the standby data comprise very small amounts of data in comparison with the ancillary data region in which the audio signal is stored and the video data region in which the video signal is stored, and therefore it does not exert an influence upon the through-put of the data transmission.

The word length of the ancillary data region is for example 69 words and corresponds to each line unit of the audio and video data of the D2 system and in which an AES/EBU data obtained by the conversion of the word width is placed. For example, where AES/EBU data of 55 words is converted to 8-bit data, the 8-bit parallel data obtained as a result of the conversion becomes 68 words and 6 bits.

In such a case, in order to prevent the generation of an inhibit code (00h, FFh), a value 01 or 10 of 2 bits is placed in the above remaining two bits. The placed 01 or 10 is cancelled when the PDU packet is reproduced in the data transmitting apparatus 3 on the reception side.

Note that, in this region, the AES/EBU data comes to have an order where the lower significant words are in front of the PDU packet and the upper significant words are at the back of the PDU packet.

In the video data region, the data mainly regarding the video among the video data consisting of one word and eight bits adapted to the ATM communication line 2 are placed in units of lines of the video data of D2 system from the word width of one word and two bits adapted to the SDI (Serial data interface) system. The video data comes to have an order where the lower significant bytes are in the front of the PDU packet and the upper significant bytes are at the back of the PDU packet.

The ancillary data region and video data region of the PDU packet have variable lengths. There also exist cases where these regions do not contain valid data. Further, the data RS422-ch1 and VOICE etc. have the validity bit V, therefore where for example only the validity data V of the data VOICE is 1 and the validity data V of the other data is 0, this means that only the data VOICE is valid, and the other data are all invalid.

Below, an explanation will be made of the relationship of the transmission data multiplexed in the ancillary data region and video data region of the PDU packet and the audio and video data of the D2 system input to or output from the VTR device 14.

Figure 4:
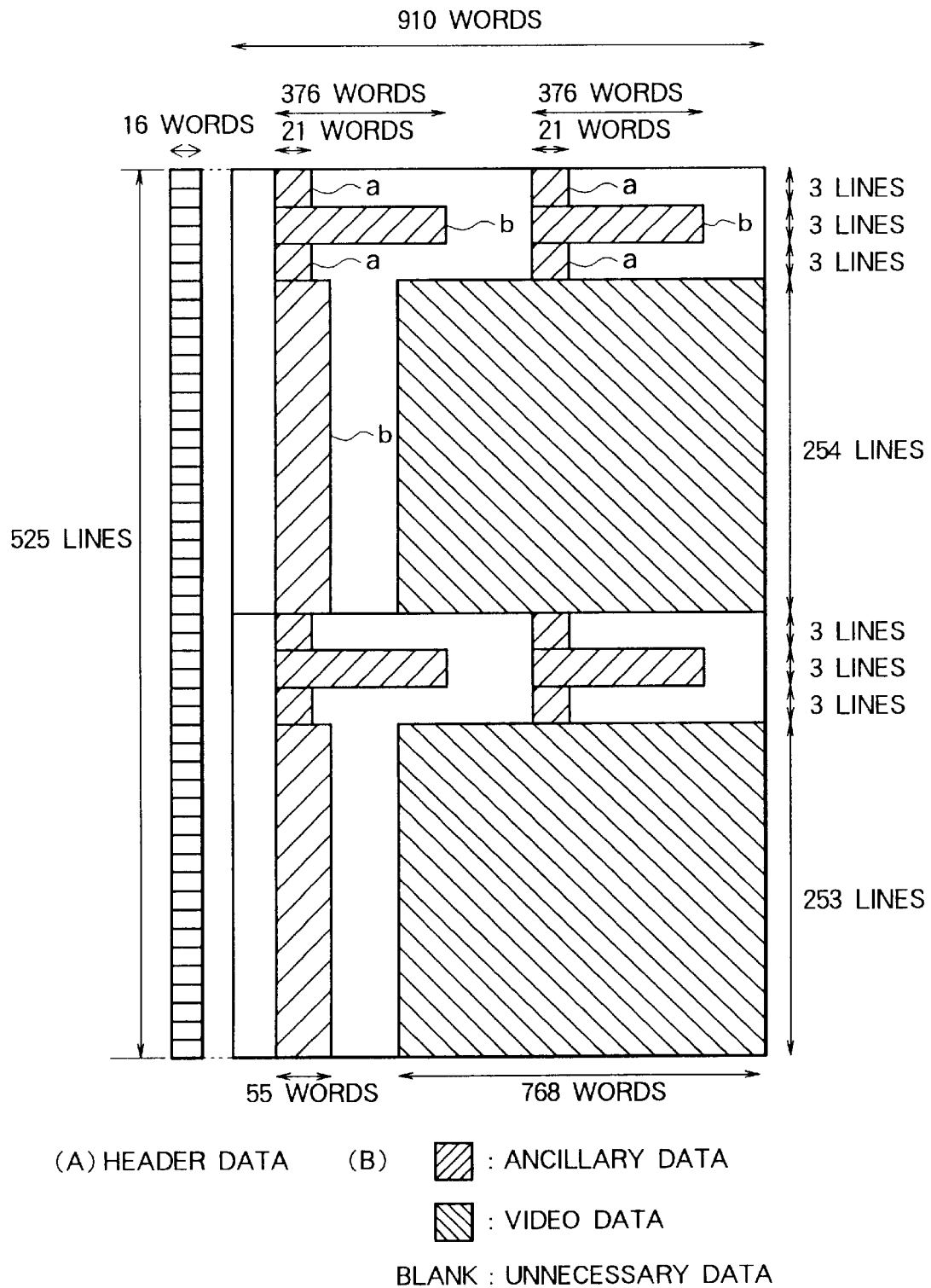
FIG. 4 is a view explaining the configuration of the audio and video data of the D2 system.

FIG. 4 is a view explaining the configuration of the audio and video data of the D2 system.

The data amount of the header data of the D2 system corresponding to a system of 525 lines and 29.97 frames per second is 16 words×8 bits for every horizontal synchronization period (1 line), therefore the data rate thereof becomes 2 Mbps as shown in the following equation.

$$16\times 8 \text{ bits} \times 525 \text{ lines} \times 29.97 \text{ frames} = 2 \text{ Mbps} \qquad (1)$$

Further, in a system of 525 lines and 28.97 frames per second, the number of pixels contained in one line is 910 and the data per pixel is 10 bits, therefore the data rate thereof becomes 142 Mbps as shown in the following equation.

$$910 \text{ pixels} \times 10 \text{ bits} \times 525 \text{ lines} \times 29.97 \text{ frames} = 143 \text{ Mbps} \qquad (2)$$

Note, as shown in FIG. 4, there is an unnecessary part in the audio and video data of the D2 system, and only the ancillary data (audio data), video data, and the header data indicated by the hatching in FIG. 4 become necessary for the audio reproduction and video reproduction on the reception side.

The data rates of the ancillary data (audio data), the video data, and the header data shown in FIG. 4 become as in the following equations.

Data amount a of ancillary data portion per second $$21\times 10 \text{ bits} \times 12 \text{ lines} \times 29.97 \text{ frames} \times 2 = 0.15 \text{ Mbps} \qquad (3)$$

Data amount b of ancillary data portion per second $$376\times 10 \text{ bits} \times 6 \text{ lines} \times 29.97 \text{ frames} \times 2 = 1.3 \text{ Mbps} \qquad (4)$$

Data amount c of ancillary data portion per second $$55\times 10 \text{ bits} \times 254 \text{ lines} \times 29.97 \text{ frames} \times 2 = 8.4 \text{ Mbps} \qquad (5)$$

Data amount d of video data portion per second $$768\times 8 \text{ bits} \times (254+253) \text{ lines} \times 29.97 \text{ frames} = 93.3 \text{ Mbps} \qquad (6)$$

Total data amount e of the video data portion and the ancillary data portion per second $$a + b + c + d = 0.15 + 1.3 + 8.4 + 93.3 = 103.2 \text{ Mbps} \qquad (7)$$

Further, when the header data is added, the data rate of the ancillary data, video data, and header data becomes 105.2 Mbps as in the following equation.

$$2 + 103.2 = 105.2 \text{ Mbps} \qquad (8)$$

In this way, in the ancillary region and the video data of the PDU packet, the data of the amount of 105.2 Mbps except the unnecessary part among the audio and video data of the D2 system (143 Mbps in total) is multiplexed in units of lines. Since the unnecessary part is eliminated in this way, the amount of the transmission data is decreased and, as a result, the audio and video data (transmission data) of the D2 system can be adapted to the AAL1 protocol.

Further, the audio and video data has periodicity as shown in FIG. 4, therefore on the transmission side and on the reception side, it can be multiplexed in the PDU packet in units of lines by a predetermined processing method. A simple hardware configuration is satisfactory.

By performing the transmission while multiplexing the transmission data and other data such as RTS data in the PDU packet mentioned above, not only is the transmission data simply transmitted, but also the data useful for the processing of the transmission data on the reception side can be transmitted together with this.

Note that, in addition to the configuration shown in the above embodiment, the data transmitting system 1 according to the present invention can take various configurations, for example the number of the data transmitting apparatus 3 may be increased or decreased, or the number of types of the data to be multiplexed in the PDU packet may be further increased.

Second Embodiment

Below, as a second embodiment of the present invention, an explanation will be made of an operation where the audio and video processing apparatus on transmission side is operated from the reception side to generate the audio and video data (transmission data) and is received via the ATM communication line 2.

Figure 5:
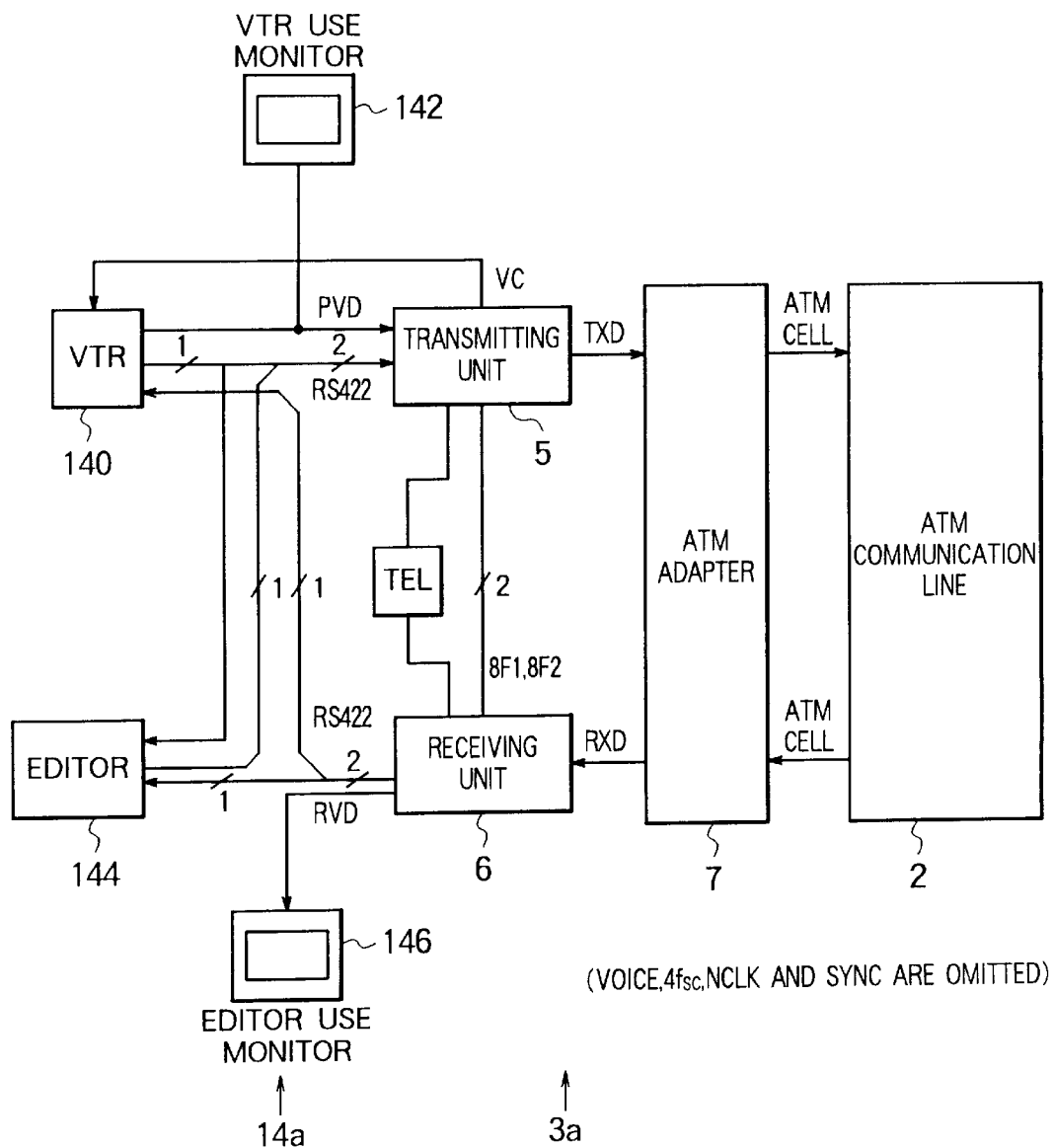
FIG. 5 is a view of the configuration of a first data transmitting apparatus (3a) and a first audio and video processing apparatus (14a) of an embodiment of the present invention.

FIG. 5 is a view of an example of the configuration of the data transmitting apparatus 3a shown in FIG. 2.

Figure 6:
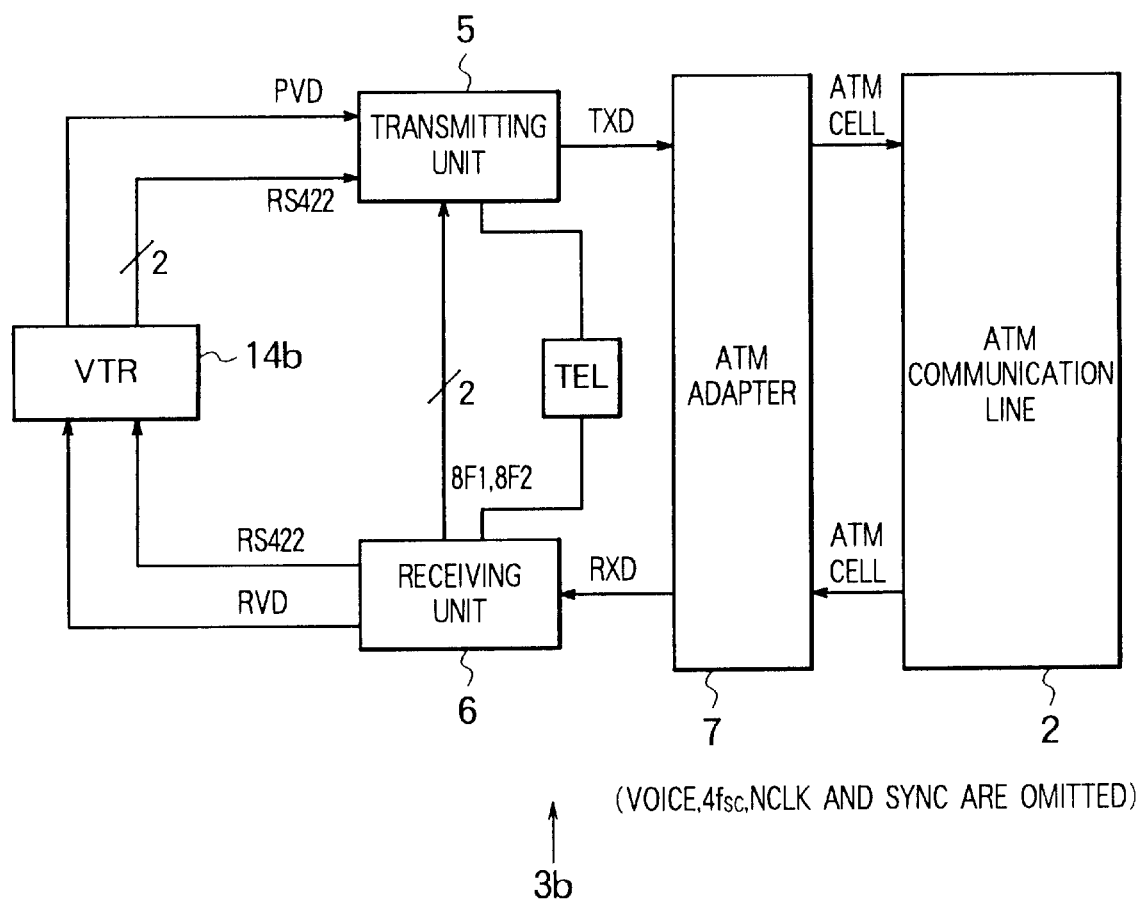
FIG. 6 is a view of the configuration of a second data transmitting apparatus (3b) and a second VTR device (14b) of the embodiment of the present invention.

FIG. 6 is a view of an example of the configuration of the data transmitting apparatus 3b shown in FIG. 2.

The data transmitting apparatuses 3a and 3b are constituted by a transmitting unit 5, a receiving unit 6, an ATM adapter 7, and audio and video processing apparatuses 14a and 14b. To the transmitting unit 5 and the receiving unit 6 are connected a telephone set TEL for the conversation for the working communication.

The audio and video processing apparatus 14a connected to the data transmitting apparatus 3a is constituted by a VTR device 140, a VTR use monitor device 142 of the D2 system, an editing device (editor) 144, and an editor use monitor device 146.

The audio and video processing apparatus 14b connected to the data transmitting apparatus 3b is for example a VTR device of the D2 system (below, the audio and video processing apparatus 14b will be described as a VTR device 14b).

The ATM adapter 7 is for example an adapter for the AAL1 protocol of the ATM system, transmits the PDU packet (FIG. 3) input from the transmitting unit 5 of the data transmitting apparatuses 3a and 3b while placing this on the payload portion of the ATM cell to the ATM communication line 2, demultiplexes the PDU packet from the payload portion of the ATM cell received from the ATM communication line 2, and outputs this to the receiving unit 6 of the data transmitting apparatuses 3a and 3b.

On the data transmitting apparatus 3a side, the VTR device 140 and editing device 144 generate control data RS422 for operating the VTR device 14b connected to the data transmitting apparatus 3b and record and edit the audio and video data, respectively.

Note that, the control data RS422 generated by the VTR device 140 etc. is multiplexed on the data RS422-ch1 and RS422-ch2 of the PDU packet shown in FIG. 3. Further, as shown in FIG. 5, the control data RS422 generated by the VTR device 140 is input to also the editing device 144 and used for the predetermined control.

Other than the control data used for the control of such editing work, the editors performing the editing work communicate regarding their work via the telephone. That communication is carried out by using the telephone set TEL. The result of dialogue by using such a telephone set TEL becomes the original information for generating the above control data.

The control data RS422 input from the VTR device 140 to the editing device 144 is used for the reproduction by the VTR, recording from a certain time, a fast forward, and the selection of the synchronization source (whether it is synchronized with the audio and video data input or synchronized with the house clock etc.) and other purposes.

The VTR use monitor device 142 and the editor use monitor device 146 display the audio and video data reproduced by the VTR device 140, respectively.

Figure 7:
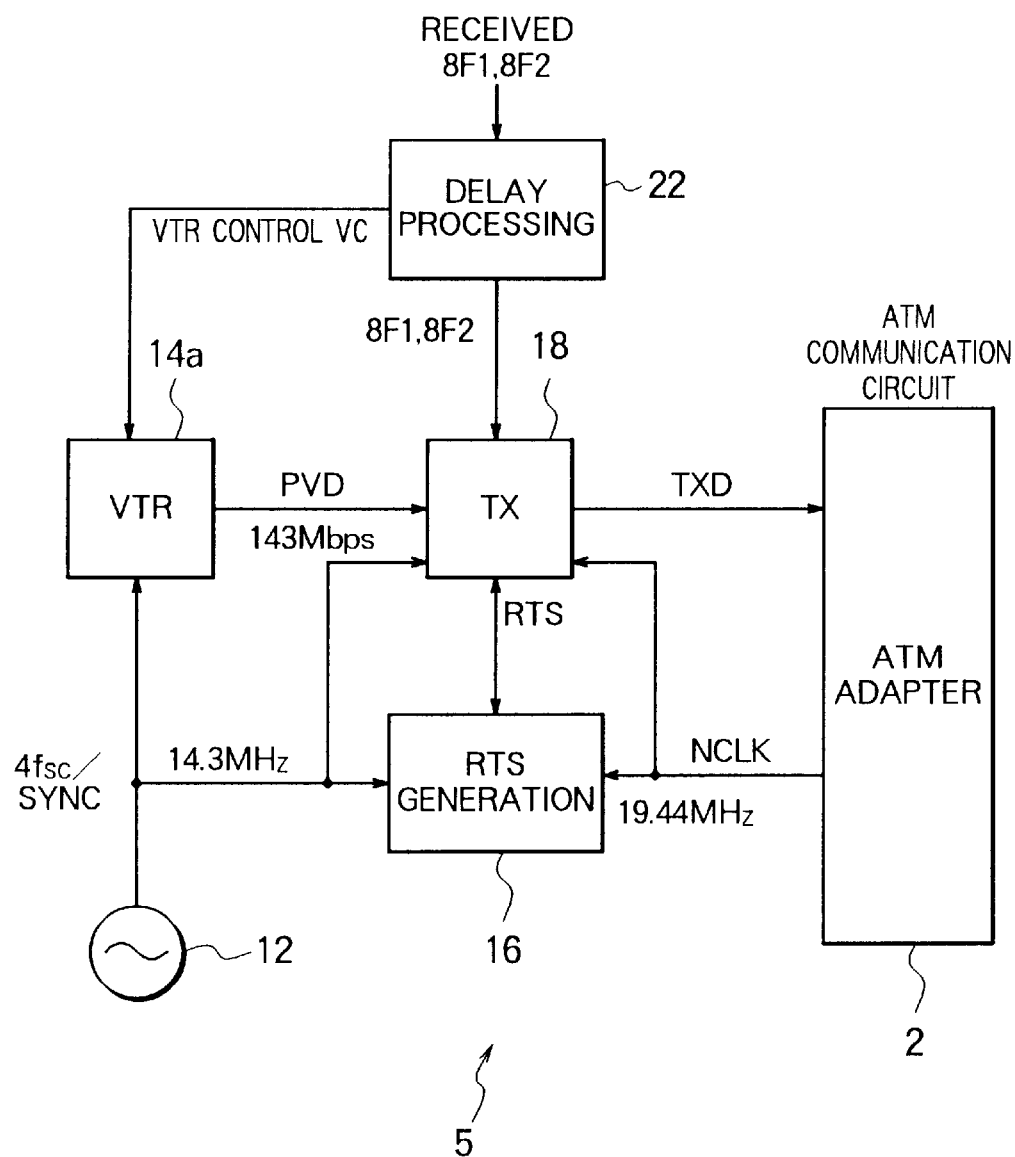
FIG. 7 is a view of the configuration of a transmitting unit in the first data transmitting apparatus shown in FIG. 5.

FIG. 7 is a view of the configuration of the transmitting unit 5 shown in FIG. 5.

The transmitting unit 5 is constituted by a clock generating device 12, an RTS generating device 16, a transmitting device (TX) 18, and a delay processing circuit 22.

The clock generating device 12 generates the internal clock $4f_{sc}$ of 14.3 MHz used in the transmitting unit 5, a synchronization signal SYNC corresponding to a horizontal synchronization signal, a vertical synchronization signal, or the like by using for example a crystal oscillator or the like and supplies the same to the VTR 14, the RTS generating device 16, and the transmitting device 18.

The VTR 14 records and reproduces the digital audio and video data of the D2 standard in synchronization with the internal clock $4f_{sc}$ and outputs the same to the transmitting device 18 in the 143 Mbps serial format according to the SDI system or SDDI system (Serial Digital Data Interface system, i.e., a system proposed by Sony Corporation).

The RTS generating device 16 generates a synchronization data RTS (Residual Time Stamp) which indicates an actual whole number ratio of the frequency of the internal clock $4f_{sc}$ with respect to the frequency of the line clock NCLK supplied from the ATM communication line 2 and used for the establishment of synchronization between the transmitting units 5 and 30.

The delay processing circuit 22 performs the delay measurement processing shown in FIG. 6 based on the bits 8F1 and 8F2 input from the receiving unit 6.

Figure 8:
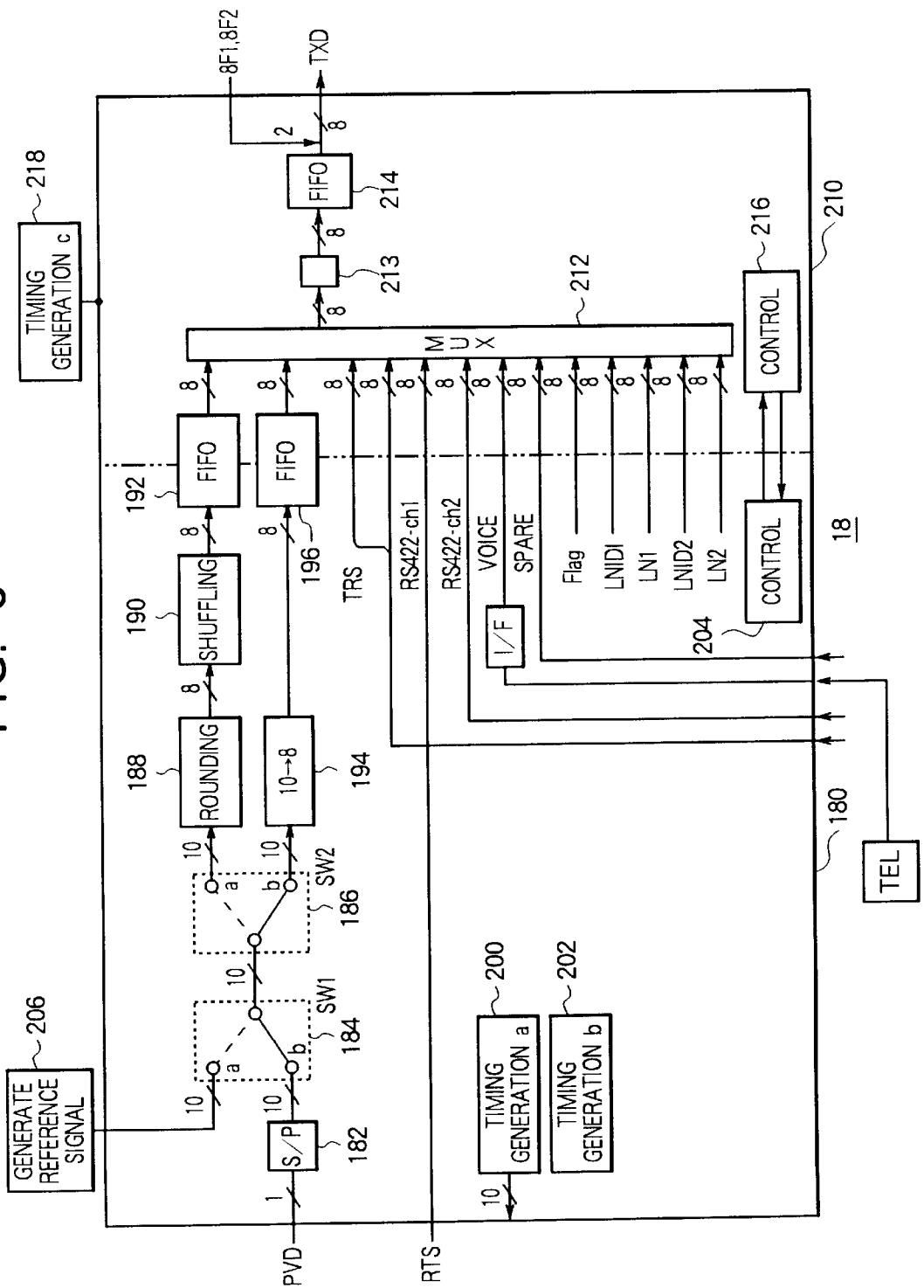
FIG. 8 is a view of the detailed configuration of the transmitting unit shown in FIG. 7.

FIG. 8 is a view of the configuration of the transmitting device 18 shown in FIG. 7.

The transmitting device 18 is connected to the ATM communication line 2 according to the AAL1 protocol and is constituted by a first block 180 operating in synchronization with the internal clock $4f_{sc}$ and a second block 210 operating in synchronization with the line clock NCLK.

The first block 180 is constituted by a serial/parallel converting circuit (S/P circuit) 182, a first switch circuit (SW1) 184, a second switch circuit (SW2) 186, a rounding circuit 188, a shuffling circuit 190, a first FIFO circuit 192, a word width converting circuit (10→8) 194, a second FIFO circuit 196, a timing generating circuit a200, a timing generating circuit b202, a control circuit 204, and a reference signal generating circuit 206.

The second block 210 is constituted by a multiplexing circuit (MUX) 212, a third FIFO circuit 214, a control circuit 216, and a timing generating circuit c218.

Further, in the first block 180, the interface I/F of the telephone set TEL is provided, the output of the interface I/F is connected to the multiplexing circuit 212 of the second block 210, and the conversation information of the telephone set TEL is multiplexed at the position of VOICE shown in FIG. 3.

In the first block 180, the timing generating circuit 200 generates video data (black burst data) corresponding to the black burst at the operation timing based on the data RTS of the value where the data is not transmitted from the other data transmitting apparatuses 3a to 3f (default).

The reference signal generating circuit 206 is a circuit on the outside of the first block 180 and generates a black burst data similar to the timing generating circuit a200 and outputs the same to the terminal a of the switch circuit 184.

The S/P circuit 182 converts the transmission data of the SDI system of a 1-bit serial format input from the audio and video processing apparatus 14 to a 10-bit parallel format and outputs the same to the terminal b of the switch circuit 184.

The switch circuit 184 selects the terminal b side and outputs the output data of the S/P circuit 182 to the switch circuit 186 where the transmitting unit 5 transmits the data, while selects the terminal a side and outputs the black burst data output from the reference signal generating circuit 206 to the switch circuit 186 in the case other than this.

The switch circuit 186 selects the video data part in the audio and video data of D2 system shown in FIG. 4 among the output data (transmission data) of the S/P circuit 182 selected by the switch circuit 184 and outputs the same to the rounding circuit 188, selects the ancillary data portion, and outputs the same to the word width converting circuit 194.

The rounding circuit 188 converts the data (video data) corresponding to the video data portion shown in FIG. 4 to the data of an 8-bit parallel format, rounds the same, and outputs it to the shuffling circuit 190. Note that, the header data shown in FIG. 4 is handled by the control circuit 204.

The shuffling circuit 190 rearranges the 8-bit parallel signals input from the rounding circuit 188 to an order by which interpolation can be easily carried out where a data error occurs in the ATM communication line 2 and outputs the same to the FIFO circuit 192.

The word width converting circuit 194 converts the data (audio data) corresponding to the ancillary data portion input from the switch circuit 186 to the 8-bit parallel format and outputs the same to the FIFO circuit 196.

The FIFO circuits 192 and 194 read the data in synchronization with the internal clock $4f_{sc}$ and sequentially output the data in synchronization with the line clock NCLK and also receive the data from the first block 180 and transfer the data to the second block 210.

The control circuits 204 and 216 monitor the addresses at which the data is written and the addresses at which the data is read out in the FIFO circuits 192 and 194, respectively, and perform the control of these addresses.

The first block 180 generates the data LN1, LNID1, LN2, and LNID2 and data FLAG (FIG. 3) based on the bits 8F1 and 8F2 and outputs the same to the second block 210.

In the second block 210, the timing generating circuit 218 controls the operation timing of the block 210 based on the line clock NCLK.

To the multiplexing circuit 212 is input the data RTS from the examination signal supplying circuit 16 and is input the data LN1, LNID1, LN2, LNID2, and Flag from the first block 180.

To the multiplexing circuit 212 is input the control data RS422 from the VTR device 140 and the editing device 144 on the data transmitting apparatus 3a side and input the control data RS422 from the VTR device 14b on the data transmitting apparatus 3b side. This control data RS422 is used for the control of the VTR device.

The multiplexing circuit 212 multiplexes these data, the audio data and video data input from the FIFO circuits 192 and 196, and the control data RS422 (RS422-ch1, RS422-ch2) and the conversation information of the telephone set TEL in the VOICE part. The data after the multiplexing of these data are output to the CRCC addition circuit 213.

The CRCC addition circuit 213 calculates each data CRCC, adds this, and outputs the same to the FIFO circuit 214.

The FIFO circuit 214 buffers the output data of the multiplexing circuit 212 and outputs the same as the transmission data TXD to the ATM communication line 2. Note that, as indicated in the figure, the bits 8F1 and 8F2 from the delay processing circuit 22 are further added to the output data of the FIFO circuit 214 which then becomes the transmission data TXD.

Figure 9:
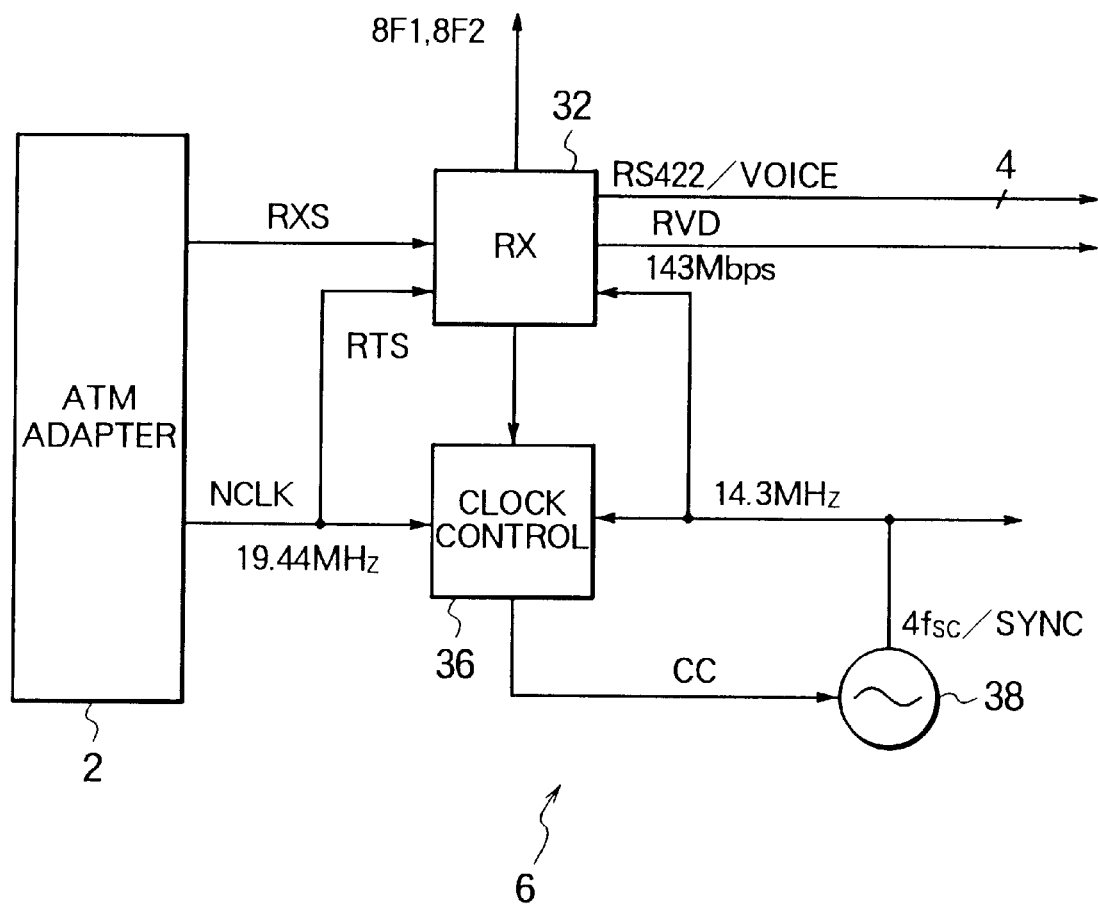
FIG. 9 is a view of the configuration of the first receiving apparatus in the first data transmitting apparatus shown in FIG. 5.

FIG. 9 is a view of the configuration of the receiving unit 6 shown in FIG. 5.

The receiving unit 6 is constituted by a receiving device (RX) 32, a VTR 34, a clock control device 36, and a clock generating device 38, receives the PDU packet transmitted from the data transmitting apparatus 3 of the transmission side, reproduces the internal clock $4f_{sc}$ in synchronization with the internal clock $4f_{sc}$ of the data transmitting apparatus 3 on the transmission side based on the synchronization data RTS and the line clock NCLK, demultiplexes the audio and video data from the PDU packet, and records the same.

Figure 10:
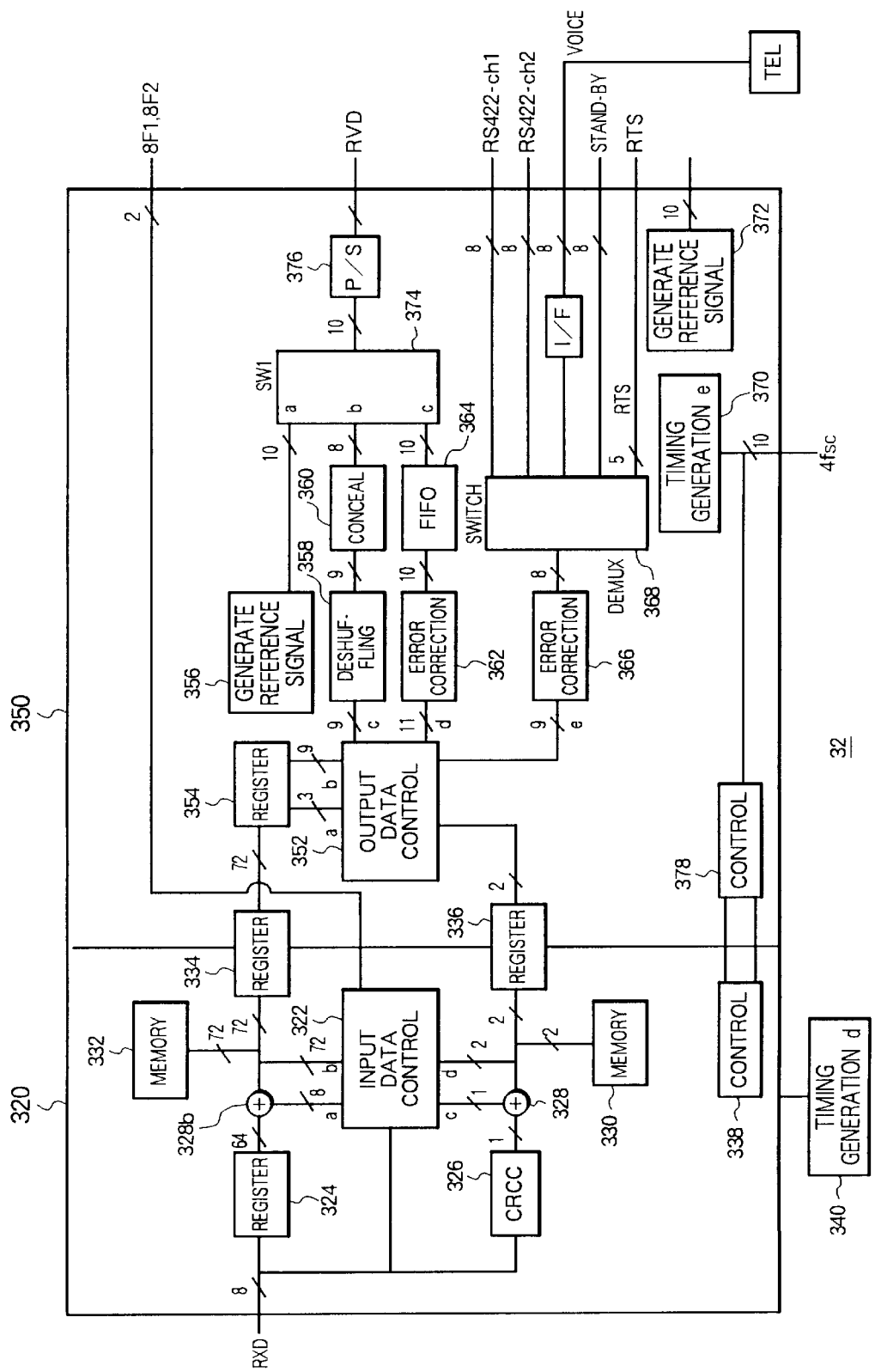
FIG. 10 is a view of the detailed configuration of the first receiving apparatus shown in FIG. 9.

FIG. 10 is a view of the configuration of the receiving device 32 shown in FIG. 9.

The receiving device 32 is connected to the ATM communication line 2 according to the AAL1 protocol and is constituted by a first block 320 operating in synchronization with the line clock NCLK and a second block 350 operating in synchronization with the internal clock $4f_{sc}$.

The receiving device 32 demultiplexes each data and audio and video data from the PDU packet received from the ATM communication line 2, outputs the transmission data among the demultiplexed data to the audio and video processing apparatus 14 as the reception data RVD, and outputs the bits 8F1 and 8F2 to the delay processing circuit 22 of the transmitting unit 5.

The first block 320 is constituted by an input data control circuit 322, a first register circuit 324, a CRCC calculating circuit 326, adder circuits 328a and 328b, a first memory circuit 330, a second memory circuit 332, a second register circuit 334, a third register circuit 336, a control circuit 338, and a timing generating circuit 340.

The second block 350 is constituted by an output data control circuit 352, a fourth register 354, a first reference signal generating circuit 356, a deshuffling circuit 358, a concealing circuit 360, a first error correcting circuit 362, an FIFO circuit 364, a second error correcting circuit 366, a switch circuit 368, a timing generating circuit e370, a second reference signal generating circuit 372, a switch circuit 374, a parallel/serial converting circuit (P/S circuit) 376, and a control circuit 378.

To the switch circuit 368 is connected to the interface I/F connected to the telephone set TEL so that conversation with the telephone set TEL shown in FIG. 8 becomes possible. Note that, the switch circuit 368 includes a circuit for performing the control operation such as the ringing of the telephone set TEL and a power supply circuit etc.

The PDU packet stored in the payload portion of the ATM cell, received by the receiving device 32 from the ATM communication line 2, is input to the input data control circuit 322, the first register circuit 324, and the CRCC calculating circuit 326.

The first register circuit 324 converts the received PDU packet of the 8 bit-parallel format to a 64 bit-parallel format.

The CRCC calculating circuit 326 performs the calculation processing regarding each data CRCC (FIG. 2) contained in the PDU packet and outputs the result of calculation to the adder circuit 328a. Note that, the CRCC calculating circuit 326 divides the transmission data $X^n+X^{n-1}+X^{n-2}+\cdots+X+1$ by $G(X)=X^{14}+X^2+X+1$, detects an error where the remainder of this is other than 0, makes the result of calculation the logical value 1, and outputs the same.

The input data control circuit 322 generates write flag data (a: 8 bit-parallel data in which all bits are logical value 0, each bit corresponding to one byte of the PDU packet) based on each data contained in the input PDU packet and outputs the same to the adder circuit 328b. The adder circuit 328b adds the write flag data to the output data of the first register circuit 324, converts the same to 72-bit width, and outputs this.

The input data control circuit 322 generates the read flag data (b) having a 9 bit×8 word configuration. The input data control circuit 322 reads the read flag data, makes only the parity bit the logical value 1 and makes all other bits the logical value 0, and writes the same in the memory circuit 332 having an address space of line number (525)×packet length of PDU packet×9 bits.

The input data control circuit 322 performs the bit operation of the read flag data in this way because when the read flag data of the read data has a logical value 1, it is decided that the required data has not arrived. Note that, when it has been written before the data is read, the read flag data becomes the logical value 0.

The register circuit 334 reads eight series of data together, each series of data consisting of 9 bits in total, i.e., 8 bits of reception data and one bit of flag data corresponding to the reception data from the memory circuit 332, as the data of 72 bits in synchronization with the line clock NCLK and outputs the same to the register 354 in synchronization with the internal clock $4f_{sc}$.

The input data control circuit 322 outputs the write flag data to the adder circuit 328a (c). The adder circuit 328a adds the write flag data to the result of calculation of the CRCC calculating circuit 326 and returns the same to the input data control circuit 322. The input data control circuit 322 stores the calculation result to which this write flag data is added in the memory circuit 330 (d).

The register circuit 336 reads the result of addition of the adder circuit 328a stored in the memory circuit 332 in synchronization with the line clock NCLK and outputs the same in synchronization with the internal clock $4f_{sc}$.

The control circuits 338 and 378 manage the write address and read address of the register circuits 334 and 336 similar to the control circuits 204 and 216 (FIG. 7) of the transmitting device 18.

In the second block 350, the timing generating circuit 370 controls the operation timing of the portions of the second block 350 based on the internal clock $4f_{sc}$.

The reference signal generating circuit 372 generates the reference signal and outputs this.

The reference signal generating circuit 356 generates the reference signal and outputs the same to the terminal a of the switch circuit 374.

The reference signals generated by the reference signal generating circuits 372 and 356 are signals not containing any video data and ancillary data and make the screen black after reproduction.

The data output from the register circuit 334 is input to the register 354. On the other hand, the data output from the register circuit 336 is input to the output data control circuit 352.

The register circuit 354 breaks down each word of the data corresponding to the ancillary data portion shown in FIG. 4 (audio data multiplexed in the ancillary region shown in FIG. 3) to the lower significant 2 bits and the parity bits thereof (a) and the upper significant 8 bits (b) and the parity bits thereof and outputs the same to the input data control circuit 322.

The output data control circuit 352 outputs the data corresponding to the video data portion shown in FIG. 4 (video data multiplexed in the video data region shown in FIG. 3) and the parity thereof to the deshuffling circuit 358 (c), outputs the data corresponding to the ancillary data portion shown in FIG. 4 (audio data multiplexed in the ancillary data region shown in FIG. 3) and the parity thereof to the error correcting circuit 362 (d), and outputs the data RS422-ch1, RS422-ch2, VOICE, RTS, and the stand-by data shown in FIG. 3 to the error correcting circuit 366 (e). That is, the output data control circuit 352 plays the part of a demultiplexing circuit for demultiplexing the audio data and video data and the data RS422-ch1 from the PDU packet too.

The output data control circuit 352 newly outputs the logical value 1 as the flag data where either one of (2), (4), (5), and (6) among the data of a: 8 bits data (1)+flag data (2), b: 2 bits (3)+flag data (4), output of register 2=CRCC1 bit+flag data (6) is the logical value 1 by this processing.

That is, the output data control circuit 352 performs conversion equipped with a flag from a: 2 words width of (reception data 8 bits+flag data 1 bit) to (ancillary data 10 bits+flag data 1 bit).

The deshuffling circuit 358 performs processing corresponding to the shuffling circuit 190 shown in FIG. 8 based on the data LNID2 and LN2 contained in the input data to return the same to the original order and outputs the resultant data to the concealing circuit 360.

The concealing circuit 360 performs the interpolation of the data for the data of, for example, a pixel in which a data error occurs by a method such as interpolation using the peripheral pixels and outputs the same to the terminal b of the switch circuit 374.

The error correcting circuit 362 performs error correction with respect to the input audio data and outputs the corrected data to the FIFO circuit 364.

The FIFO circuit 364 matches the timings of the video data output from the concealing circuit 360 and the data output from the error correcting circuit 362 and outputs the resultant data to the terminal c of the switch circuit 374.

The switch circuit 374 selects either of the reference signal from the reference signal generating circuit 356, the output data of the concealing circuit 360, or the output signal of the FIFO circuit 364, being respectively input to the terminals a to c, in an order adapted to the audio and video data of the D2 system in the SDI system and outputs the selected data to the P/S circuit 376.

The P/S circuit 376 converts the data input from the switch circuit 374 to the data of the serial format and outputs the same to the VTR device 14 in synchronization with the internal clock $4f_{sc}$.

The error correcting circuit 366 performs error correction with respect to the input data such as the data RS422-ch1 and outputs the same to the switch circuit 368.

The switch circuit 368 demultiplexes the error-corrected data to the data RS422-ch1, RS422-ch2, VOICE, RTS, and stand-by data, respectively.

Note that, in the transmitting apparatus 3a, the data RS422-ch1 and RS422-ch2 are output to the VTR device 140 and the editing device 144 (FIG. 5: RS422)

Further, in the data transmitting apparatus 3b, the data RS422-ch1 and RS422-ch2 are output to the VTR device 14b (FIG. 6: RS422).

The audio and video processing apparatus 14 (FIG. 5, FIG. 6) records the audio and video data RVD input from the P/S converting circuit 330 in synchronization with the internal clock $4f_{sc}$.

The clock generating device 38 is a voltage controlled oscillating circuit having for example a crystal oscillating circuit, generates the internal clock $4f_{sc}$ of the frequency in accordance with the control of the clock control device 36 via the clock control signal CC, and supplies the same to the constituent portions of the receiving unit 6 of the data transmitting apparatus 3.

The clock control device 36 generates the clock control signal CC based on the synchronization data RTS input from the receiving device 32, controls the frequency of the internal clock $4f_c$ generated by the clock generating device 38 via this clock control signal CC, brings the internal clock $4f_{sc}$ of the transmitting apparatus 30 into synchronization with the internal clock $4f_{sc}$ of the transmitting apparatus 10, and further generates the synchronization signal SYNC corresponding to the horizontal synchronization signal, vertical synchronization signal, or the like and supplies the same to the audio and video processing apparatus 14 etc.

Below, referring to FIG. 2 again, an explanation will be made of the operation of the data transmitting system 1 using the audio and video processing apparatuses 14a and 14b shown in the second embodiment by taking as an example a case where the data is transmitted between the data transmitting apparatuses 3a and 3b.

On the data transmitting apparatus 3a side, the VTR device 140 and the editing device 144 of the audio and video processing apparatus 14a generate the control data RS422 for operating the VTR device 14b.

The control data generated by the VTR device 140, etc. are for example the data designating the audio and video data reproduced in the VTR device 14b on the data transmitting apparatus 3b side, the data designating the reproducing method such as a fast forward, fast rewind, jog shuttle reproduction, etc.

The data transmitting apparatus 3a multiplexes the control data RS422 on the data RS422-ch1 and RS422-ch2 of the PDU packet, multiplexes the conversation information of the telephone set on VOICE, multiplexes the audio data in the ancillary portion, and multiplexes the video data in the VIDEO portion and outputs the same to the ATM adapter 7.

The ATM adapter 7 places the PDU packet on the payload part of the ATM cell and transmits the same via the ATM communication line 2 to the data transmitting apparatus 3b.

The ATM adapter 7 demultiplexes the payload portion of the ATM cells sent from the data transmitting apparatus 3a and sequentially outputs the same to the data transmitting apparatus 3b.

The data transmitting apparatus 3b demultiplexes the control data from the data RS422-ch1 and RS422-ch2 of the PDU packet transmitted from the data transmitting apparatus 3a and outputs the same to the VTR device 14b.

The VTR device 14b performs for example the selection of the audio and video data to be reproduced, fast forward, fast rewind, usual reproduction, or special reproduction such as a jog shuttle according to the control data, generates the audio data and video data of the D2 system, and outputs the same to the data transmitting apparatus 3b.

The data transmitting apparatus 3b multiplexes the audio data and video data input from the VTR device 14b in the PDU packet shown in FIG. 3 and transmits the same via the ATM communication line 2 to the data transmitting apparatus 3a.

Similar to the above control data, the conversation information is multiplexed on VOICE and transmitted via the telephone set TEL.

Note that, it is also possible to control the VTR device 14b so as to reproduce the recorded audio and video data while recording by using another head, i.e., perform so-called confidence reproduction.

The data transmitting apparatus 3a outputs the audio and video data transmitted from the data transmitting apparatus 3b to the audio and video processing apparatus 14a.

The editor use monitor device 146 of the audio and video processing apparatus 14a displays the audio and video data, the VTR device 140 records the audio and video data, or the editing device 144 edits the audio and video data according to the operation of the editor (not illustrated).

As explained above, according to the data transmitting system 1 of the present invention, it is possible to designate the content and reproducing method of the audio data and video data to be reproduced on the VTR device 14b by one ATM communication line and, at the same time, transmit the reproduced audio and video data.

Further, according to the data transmitting system 1 of the present invention, the SDI system which has been widely used as the infrastructure in the television broadcasting stations etc. can be used as the interface of the VTRs 14 and therefore the already existing equipment can be easily connected to an ATM communication line.

Note that, the circuit configuration etc. of the transmitting unit 5 and the receiving unit 6 shown in the above embodiments are examples. It is also possible to replace them by circuits which can realize an equivalent function.

Further, as the apparatus connected to the data transmitting unit 3b, the VTR device of the D2 system was exemplified, but the apparatus is not limited to this. It is possible even if an editing device, relaying device, or transmitting equipment for inputting and outputting data by for example the SDI system is connected.

Further, the PDU packet shown in FIG. 2 is an example. The present invention can be adapted to a transmitting system using a transmission packet of another format.

Further, the data transmitting system 1, the transmitting unit 5, and the receiving unit 6 according to the present invention can be applied to either of the audio or video data or data for information processing in addition to the audio and video data.

Third Embodiment

Below, an explanation will be made of a case where the communication is carried out between any apparatuses among the data transmitting apparatuses 3a to 3f by using a voice and text data etc. as a third embodiment of the present invention.

Figure 11:
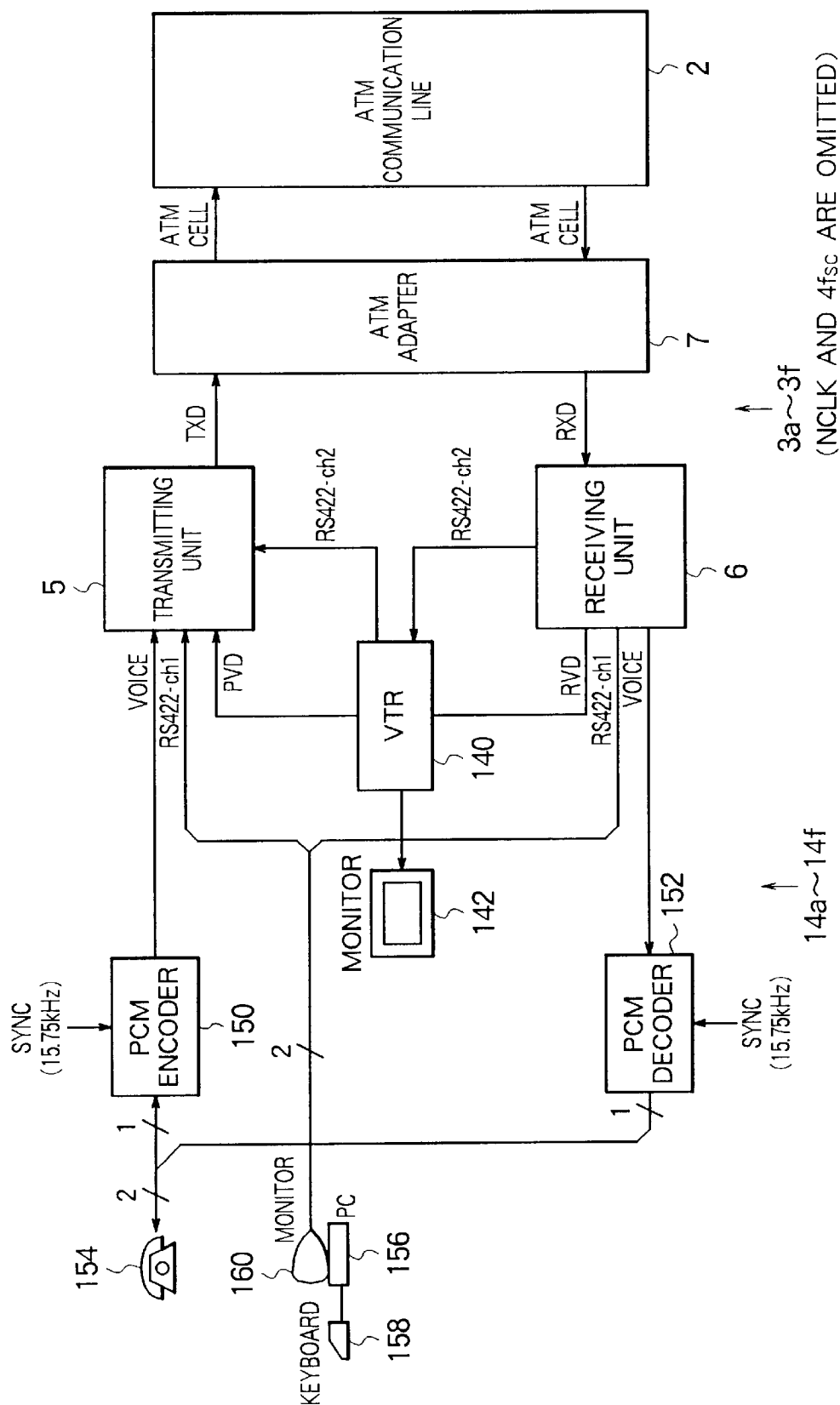
FIG. 11 is a view of another configuration of the first data transmitting apparatus and the first audio and video processing apparatus of a third embodiment of the present invention.

FIG. 11 is a view of the configuration of the data transmitting apparatuses 3a to 3f and the audio and video processing apparatuses 14a to 14f shown in FIG. 1 in the third embodiment. Note that, in FIG. 11, the same constituent parts as the constituent parts of the audio and video processing apparatus 14a shown in FIG. 10 are given the same reference numerals.

When communication is to be performed among any of the data transmitting apparatuses 3a to 3f by using voice, text data, etc., the audio and video processing apparatuses 14a to 14f take the configuration shown in FIG. 11. That is, each of the audio and video processing apparatuses 14a to 14f is constituted by a VTR device 140, a VTR use monitor device 142, a PCM encoder 150, a PCM decoder 152, a telephone set 154, a personal computer 156, a keyboard 158, and a personal computer use monitor device 160.

The telephone set 154 has a microphone and a speaker (receiver), outputs the analog voice signal input from the microphone to the PCM encoder 150, stores the conversation data of the telephone set 154 converted to the analog voice signal by the PCM encoder 152 in VOICE (FIG. 3) and transmits the same via the communication line 2, and outputs this from the speaker of the telephone set of the other party.

The PCM encoder 150 performs 8-bit PCM coding for the analog voice signal input from the telephone set 154 by a sampling frequency (7.875 KHz) of a half of the horizontal synchronization signal of 15.75 KHz contained in the synchronization signal SYNC generated by the clock generating device 12, generates the conversation data VOICE, and outputs the same to the transmitting device 18 of the transmitting unit 5.

The PCM decoder 152 converts the data VOICE input from the receiving device 32 of the receiving unit 6 to the analog voice signal and outputs the same to the telephone set 154.

The personal computer 156 operates as the terminal equipment of the transmitting unit 5 and the receiving unit 6, outputs character data input from the keyboard 158, the text data and image data etc. obtained from a floppy disk drive (FDD) connected to the personal computer 156, hard disk drive (HDD), magneto-optic disk device (MOD), mouse device (all not illustrated), etc. to the transmitting unit 5 as the data RS422-ch1 and displays the character data, text data, image data, etc. input from the receiving unit 6 on the monitor device 160.

Below, an explanation will be made of the operation of the data transmitting system 1 using the audio and video processing apparatuses 14a and 14b shown in the third embodiment by taking as an example a case where the data is transmitted between the data transmitting apparatuses 3a and 3b.

Similar to the case shown in the second embodiment, on the data transmitting apparatus 3a side, the user operates the audio and video processing apparatus 14a, performs the designation of the audio and video data (transmission data) to be reproduced by the audio and video processing apparatus 14b on the data transmitting apparatus 3b side, the designation of the reproducing method, etc., multiplexes this on the data RS422-ch2 of the PDU packet, and transmits the same via the ATM communication line 2 to the data transmitting apparatus 3b.

The VTR device 140 on the data transmitting apparatus 3b side reproduces the designated audio and video data by the designated reproducing method. The data transmitting apparatus 3b transmits the audio and video data reproduced by the VTR device 140 via the ATM communication line 2 to the data transmitting apparatus 3a.

The VTR device 140 on the data transmitting apparatus 3a side records the transmitted audio and video data and displays the same on the VTR use monitor device 142.

The audio and video processing apparatuses 14a and 14b shown in FIG. 11 further perform the following operation in addition to the same operation as that by the audio and video processing apparatuses 14a and 14b shown in FIG. 10 in the second embodiment.

The user of the data transmitting apparatus 3a makes a telephone call to the user of the data transmitting apparatus 3b by using the telephone set 154 while viewing the image displayed on the VTR use monitor device 142.

That is, the voice of the user of the data transmitting apparatus 3a is input via the telephone set 154 on the data transmitting apparatus 3a side to the PCM encoder 150, converted to the voice data of 63 Kbps (7.875 KHz×8 bits), multiplexed as the data VOICE with a ratio of one sample per two PDU packets by the transmitting unit 5 and the ATM adapter 7, and transmitted via the ATM communication line 2 to the data transmitting apparatus 3b.

The data VOICE input to the transmitting unit 5 via the ATM adapter 7 on the data transmitting apparatus 3b side is converted to the analog voice data by the PCM decoder 152 on the data transmitting apparatus 3b side and output to the user of the data transmitting apparatus 3b.

The operation of the PCM encoder 150, the PCM decoder 152, and the telephone set 154 explained above is the same also in the case where the voice data is transmitted from the data transmitting apparatus 3b to the data transmitting apparatus 3a.

Note that, the telephone call function between the telephone sets 154 explained above is used between the users of the data transmitting apparatuses 3a and 3b for example for the consultation between the two, indication of the replacement of a tape of the VTR device 140 on the data transmitting apparatus 3b side, etc.

Further, the user of the data transmitting apparatus 3a may input character data to the personal computer 156 via the keyboard 158.

The character data input to the personal computer 156 on the data transmitting apparatus 3a side is multiplexed on the data RS422-ch1 of the PDU packet and transmitted via the ATM communication line 2 to the data transmitting apparatus 3b.

The data transmitting apparatus 3b demultiplexes the data RS422-ch1 from the PDU packet and outputs the same to the personal computer 156.

The personal computer 156 displays the character data input from the data transmitting apparatus 3b on the monitor device 160.

Note that, the data is not always input from the PCM encoder 150 and the personal computer 156 to the transmitting unit 5, therefore the first block 180 (FIG. 8) of the transmitting device 18 performs the control of the validity bit V (FIG. 2) of each data and notifies whether or not valid data has been input to the receiving unit 6 of the other party of the communication.

The receiving unit 6 of the other party of the communication performs the processing for outputting the data to the PCM decoder 152 and the personal computer 156 only in a case where the validity bit V indicates the data is valid.

The operation for the data communication between the personal computers 156 explained above is true also for a case where the character data is transmitted from the data transmitting apparatus 3b side to the data transmitting apparatus 3a side or the text data, image data, etc. are transmitted between them.

Note that, the data communication function explained above is used for consultations between the users of 3b similar to the telephone call function of the telephone set 154.

As explained above, according to the data transmitting system 1 of the present invention, not only is the VTR device 140 on the data transmitting apparatus 3b side operated from the data transmitting apparatus 3a side, but also the telephone call function and data communication function can be provided to the users. Accordingly, enhancement of the efficiency of the editing work of the audio and video data etc. can be achieved.

Further, it is sufficient even if a telephone line and a communication line for the data communication are not separately prepared for the communication. Therefore the cost of the communication can be reduced.

Note that, the operation of the data transmitting apparatuses 3a and 3b mentioned above is the same in the telephone call function and data communication function between any apparatuses among the data transmitting apparatuses 3a to 3f.

Fourth Embodiment

Figure 12C:
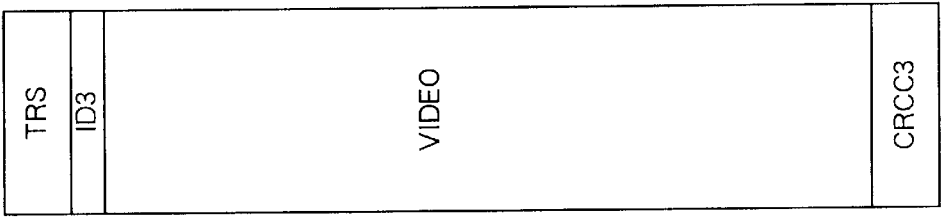
FIG. 12A to FIG. 12C are views of another format of the present invention.
Figure 12B:
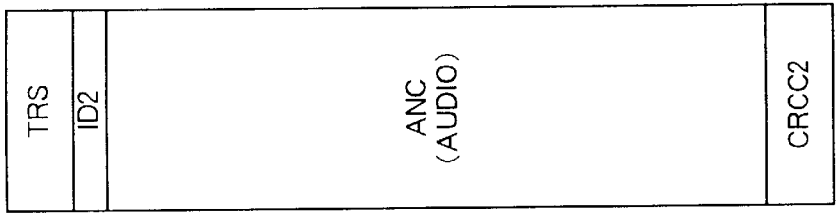
Figure 12A:
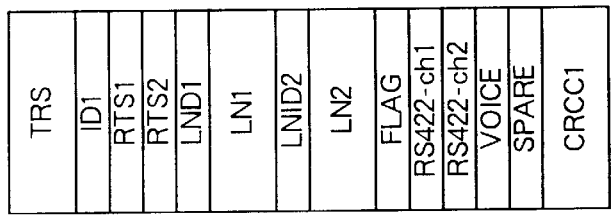

FIG. 12A to FIG. 12C show an example of a modification of the format shown in FIG. 3.

In the example shown in FIG. 3, a case where the region for storing control and management data other than the video data and audio data such as VOICE and RS422, the ancillary region for storing the audio data, and the VIDEO region for storing the video data are multiplexed and the data is transmitted together was shown.

FIG. 12A shows only the region for storing the control and management data other than the video data and audio data such as VOICE and RS422 in addition to the TRS and identification code ID1; FIG. 12B shows the region for storing the audio data in addition to the TRS and identification code ID2; and FIG. 12C shows the region for storing the TRS and identification code ID3 and the video data while separating them, respectively.

In the fourth embodiment, the control and management data are transmitted by the format illustrated in FIG. 12A, and then the audio data is transmitted with the format shown in FIG. 12B, and further the video data is transmitted with the format illustrated in FIG. 12C. Namely, in the fourth embodiment, the information illustrated in FIG. 12A to FIG. 12C are transmitted while being time-divided at different timings, respectively. The conversation information of the telephone set mentioned above is transmitted stored in the part of the VOICE shown in FIG. 12A. Also the other control information is transmitted stored at the predetermined position shown in FIG. 12A. The type of these data can be recognized by identifying the identification codes ID1 to ID3.

In the fourth embodiment, the amount of data transmitted at one time becomes small, therefore there is an advantage that the time during which the communication line 2 is continuously occupied can be shortened and the influence exerted upon the data transmission of the other system is small.

In general, the amount of transmission of the video data is especially large. From the viewpoint of shortening the continuous occupying time of the communication line 2, it is also possible to limit the amount of the video data to be stored in the VIDEO region illustrated in FIG. 12C to a predetermined value and, when it exceeds that value, to divide the transmission of the video data to a plurality of number of times and transmit the same.

In the above embodiment, a case where the telephone set was used for the communication between the two sides of the communication line 2 was exemplified, but communication by documents can be enabled too by using a facsimile apparatus using the telephone line in place of the telephone set or together with the telephone set.

Further, for mutual communication, it is also possible to exchange information through computer communication and not with the dialogue by telephone sets or in addition to dialogue by telephone sets. Also in the case of the computer communication, where the information is exchanged by using a MODEM etc., the working communication information can be transmitted similar to the communication using the telephone sets mentioned above.

In the working of the present invention, the above embodiments can be appropriately combined. Further, the working of the present invention is not limited to the above embodiments and can take various modified aspects.

As explained above, according to the data transmitting apparatus and the data transmitting method of the present invention, the transmission of the transmission data is carried out by using an ATM communication line etc. and, at the same time, a voice call function and data communication function can be provided.

Further, according to the data transmitting apparatus and the data transmitting method of the present invention, even if a voice call and data communication are made for communication together with the transmission of the transmission data, a plurality of communication lines are not required and the communication cost does not become high either.

INDUSTRIAL APPLICABILITY

The data transmitting system of the present invention can be applied to a variety of purposes of transmitting a digital video signal and transmitting conversation information, computer information, etc. by using the same communication system.

LIST OF REFERENCE NUMERALS

1 . . . data transmitting system;
2 . . . ATM comunication line;
3, 3a to 3f . . . data transmitting apparatus;
5 . . . transmitting unit;
6 . . . receiving unit;
7 . . . ATM adapter;
14, 14a to 14f . . . audio and video processing apparatus (VTR device);
18 . . . transmitting device;
32 . . . receiving device;
140 . . . VTR device;
142 . . . VTR use monitor device;
144 . . . editing device;
146 . . . editor use monitor device;
154 . . . telephone set;
156 . . . personal computer.

We claim:

1. A data transmitting system comprising:

a communication system enabling a communication of a digital signal;

a first transmitting apparatus having transmitting means connected to said communication system; and a second transmitting apparatus having receiving means connected to said communication system and performing a digital data transmission with said first transmitting apparatus in cooperation with said first transmitting apparatus, said transmitting means of said first transmitting apparatus for transmitting a digital video signal and first digital working information concerning a processing of said digital video signal as digital information to said communication system, and said receiving means of said second transmitting apparatus for receiving said digital video signal and said first digital working information transmitted by said transmitting means of said first transmitting apparatus from said communication system, wherein said communication system transmits a signal of an SDI (Serial Data Interface) format, said digital video signal and said first digital working information are transmitted by the SDI format, said communication system includes a communication line of an asynchronous transmission mode (ATM) system, and an adapter for performing signal adjustment between said SDI format or an SDDI (Serial Digital Data Interface) format and the format of said communication line is provided between said data transmitting apparatus and said communication system.

2. A data transmitting system comprising:

a communication system enabling a communication of a digital signal;

a first transmitting apparatus having transmitting means connected to said communication system; and a second transmitting apparatus having receiving means connected to said communication system and performing a digital data transmission with said first transmitting apparatus in cooperation with said first transmitting apparatus, said transmitting means of said first transmitting apparatus for transmitting a digital video signal and first digital working information concerning a processing of said digital video signal as digital information to said communication system, and said receiving means of said second transmitting apparatus for receiving said digital video signal and said first digital working information transmitted by said transmitting means of said first transmitting apparatus from said communication system, wherein said communication system transmits a signal of an SDI (Serial Data Interface) format, said digital video signal and said first digital working information are transmitted by the SDI format, said first transmitting means includes multiplexing means, said first digital working information is transmitted while being multiplexed on one part of the transmission format of said digital video signal at the transmission of said digital video signal, and said second receiving means has demultiplexing means for demultiplexing said multiplexed and transmitted signal.

3. A data transmitting system comprising:

a communication system enabling a communication of a digital signal;

a first transmitting apparatus having transmitting means connected to said communication system; and a second transmitting apparatus having receiving means connected to said communication system and performing a digital data transmission with said first transmitting apparatus in cooperation with said first transmitting apparatus, said transmitting means of said first transmitting apparatus for transmitting a digital video signal and first digital working information concerning a processing of said digital video signal as digital information to said communication system, and said receiving means of said second transmitting apparatus for receiving said digital video signal and said first digital working information transmitted by said transmitting means of said first transmitting apparatus from said communication system, wherein said communication system transmits a signal of an SDI (Serial Data Interface) format, said digital video signal and said first digital working information are transmitted by the SDI format, and the first digital working information is transmitted at a timing different from that at the transmission of said digital video signal.

4. The data transmitting system according to claim 1, 2, or 3, wherein said first digital working information transmitted between said first transmitting apparatus and said second transmitting apparatus is telephone information.

5. The data transmitting system according to claim 1, 2, or 3, wherein said first digital working information transmitted between said first transmitting apparatus and said second transmitting apparatus is computer information.

* * * * *